(12) United States Patent
Laneman et al.

(10) Patent No.: US 6,662,339 B1
(45) Date of Patent: Dec. 9, 2003

(54) ERROR SCREENING BASED ON CODE AND CONTROL INFORMATION CONSISTENCY IN A COMMUNICATION SYSTEM

(75) Inventors: Jerry Nicholas Laneman, Cambridge, MA (US); Deepen Sinha, Chatham, NJ (US); Carl-Erik Wilhelm Sundberg, Chatham, NJ (US); James Walter Tracey, Chester, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/464,042

(22) Filed: Dec. 15, 1999

(51) Int. Cl.[7] .............................. G06F 11/00; H04L 1/00; H03L 13/00
(52) U.S. Cl. ........................ 714/799; 714/754; 714/811
(58) Field of Search .................................. 714/701, 795, 714/746, 752, 754, 758, 760, 774, 781, 783, 786, 791, 792, 799, 811; 341/143; 375/227, 224, 262, 265, 341

(56) References Cited

U.S. PATENT DOCUMENTS

| | | | | |
|---|---|---|---|---|
| 5,323,402 A | * | 6/1994 | Vaccaro et al. ............. | 714/782 |
| 5,463,641 A | | 10/1995 | Dorward et al. ............ | 371/374 |
| 5,764,646 A | * | 6/1998 | Dent ........................... | 370/479 |
| 6,009,553 A | * | 12/1999 | Martinez et al. ............ | 714/784 |
| 6,157,642 A | * | 12/2000 | Sturza et al. ............... | 370/389 |

OTHER PUBLICATIONS

D. Sinha, J.D. Johnston, S. Dorward and S.R. Quackenbush, "The Perceptual Audio Coder," in Digital Audio, Section 42, pp. 42–1 to 42–18, CRC Press, 1998.

N.S. Jayant and E.Y. Chen, "Audio Compression: Technology and Applications," AT&T Technical Journal, pp. 23–34, vol. 74, No. 2, Mar.–Apr. 1995, vol. 74, No. 2.

B.W. Kroeger and A.J. Vigil, "Improved IBOC DAB Technology for AM and FM Broadcasting," SBE Engineering Conference, pp. 1–10, 1996.

B. Kroeger and D. Cammarata, "Robust Modem and Coding Techniques for FM Hybrid IBOC DAB," IEEE Transactions on Broadcasting, vol. 43, No. 4, pp. 412–420, Dec. 1997.

B.W. Kroeger and P.J. Peyla, "Compatibility of FM Hybrid In–Band On–Channel (IBOC) System for Digital Audio Broadcast," IEEE Transactions on Broadcasting, vol. 43, No. 4, pp. 421–430, Dec. 1997.

* cited by examiner

Primary Examiner—Christine T. Tu
(74) Attorney, Agent, or Firm—Ryan, Mason & Lewis, LLP (57) ABSTRACT

Improved error screening techniques are used in processing digital audio or other types of information received in a digital communication system. Control information associated with a given packet of the received information is identified and compared with a decoding requirement of the packet, in order to control the generation of an error indicator for the packet. More particularly, the error indicator may be generated in response to an inconsistency between the control information and the decoding requirement. For example, the control information may include an indication of packet length that can be compared to a number of bits required to decode the corresponding packet, with any inconsistency between the packet length indication and the number of required bits leading to the generation of an error flag for the packet. The invention is particularly well-suited for use in the processing of encoded digital audio information received in a hybrid in-band on-channel (HIBOC) digital audio broadcasting (DAB) system, but is also applicable to other types of information and other types of communication systems.

20 Claims, 5 Drawing Sheets

ERROR SCREENING BASED ON CODE AND CONTROL INFORMATION CONSISTENCY IN A COMMUNICATION SYSTEM

FIELD OF THE INVENTION

The present invention relates generally to digital audio broadcasting (DAB) and other techniques for transmitting information in a communication system.

BACKGROUND OF THE INVENTION

Proposed systems for providing digital audio broadcasting (DAB) in the FM radio band are expected to provide near CD-quality audio, data services, and more robust coverage than existing analog FM transmissions. However, until such time as a transition to all-digital DAB can be achieved, broadcasters require an intermediate solution in which the analog and digital signals can be transmitted simultaneously within the same licensed band. Such systems are typically referred to as hybrid, in-band on-channel (HIBOC) DAB systems, and are being developed for both the FM and AM radio bands. In order to prevent significant distortion in conventional analog FM receivers, the digital signal in a typical FM HIBOC DAB system is, e.g., transmitted in two sidebands, one on either side of the analog FM host signal.

Perceptual audio coding techniques are particularly attractive for FM band and AM band transmission applications such as HIBOC DAB. Perceptual audio coding devices, such as the perceptual audio coder (PAC) described in D. Sinha, J. D. Johnston, S. Dorward and S. R. Quackenbush, "The Perceptual Audio Coder," in Digital Audio, Section 42, pp. 42-1 to 42-18, CRC Press, 1998, which is incorporated by reference herein, perform audio coding using anoise allocation strategy whereby for each audio frame the bit requirement is computed based on a psychoacoustic model. PACs and other audio coding devices incorporating similar compression techniques are inherently packet-oriented, i.e., audio information for a fixed interval (frame) of time is represented by a variable bit length packet. Each packet includes certain control information followed by a quantized spectral/subband description of the audio frame. For stereo signals, the packet may contain the spectral description of two or more audio channels separately or differentially, as a center channel and side channels (e.g., a left channel and a right channel).

PAC encoding as described in the above-cited reference may be viewed as a perceptually-driven adaptive filter bank or transform coding algorithm. It incorporates advanced signal processing and psychoacoustic modeling techniques to achieve a high level of signal compression. In brief, PAC encoding uses a signal adaptive switched filter bank which switches between a Modified Discrete Cosine Transform (MDCT) and a wavelet transform to obtain: compact description of the audio signal. The filter bank output is quantized using non-uniform vector quantizers. For the purpose of quantization, the filter bank outputs are grouped into so-called "coderbands" so that quantizer parameters, e.g., quantizer step sizes, are independently chosen for each coderband. These step sizes are generated in accordance with a psychoacoustic model. Quantized coefficients are further compressed using an adaptive Huffman coding technique. PAC employs a total of 15 different codebooks, and for each codeband, the best codebook may be chosen independently. For stereo and multichannel audio material, sum/difference or other form of multichannel combinations may be encoded.

PAC encoding formats the compressed audio information into a packetized bitstream using a block sampling algorithm. At a 44.1 kHz sampling rate, each packet corresponds to 1024 input samples from each channel, regardless of the number of channels. The Huffman encoded filter bank outputs, codebook selection, quantizers and channel combination information for one 1024 sample block are arranged in a single packet. Although the size of the packet corresponding to each 1024 input audio sample block is variable, a long-term constant average packet length may be maintained as will be described below.

Depending on the application, various additional information may be added to the first frame or to every frame. For unreliable transmission channels, such as those in DAB applications, a header is added to each frame. This header contains critical PAC packet synchronization information for error recovery and may also contain other useful information such as sample rate, transmission bit rate, audio coding modes, etc. The critical control information is further protected by repeating it in two consecutive packets.

It is clear from the above description that the PAC bit demand is derived primarily by the quantizer step sizes, as determined in accordance with the psychoacoustic model. However, due to the use of Huffman coding, it is generally not possible to predict the precise bit demand in advance, i.e., prior to the quantization and Huffman coding steps, and the bit demand varies from frame to frame. Conventional PAC encoders therefore utilize a buffering mechanism and a rate loop to meet long-term bit rate constraints. The size of the buffer in the buffering mechanism is determined by the allowable system delay.

In conventional PAC bit allocation, the encoder makes a request for allocating a certain number of bits for a particular audio frame to a buffer control mechanism. Depending upon the state of the buffer and the average bit rate, the buffer control mechanism then returns the maximum number of bits which can actually be allocated to the current frame. It should be noted that this bit assignment can be significantly lower than the initial bit allocation request. This indicates that it is not possible to encode the current frame at an accuracy level for perceptually transparent coding, i.e., as implied by the initial psychoacoustic model step sizes. It is the function of the rate loop to adjust the step sizes so that bit demand with the modified step sizes is below, and close to, the actual bit allocation. The rate loop operates based on psychoacoustic principles to minimize the perception of excess noise.

Despite the above-described advances in DAB systems which utilize PAC encoding, a need exists for further improvements in techniques for transmitting digital audio and other information, so as to provide enhanced performance capabilities in these and other systems.

SUMMARY OF THE INVENTION

The present invention provides methods and apparatus for implementing error screening in digital audio broadcasting (DAB) systems or other types of digital communication systems, so as to provide enhanced performance relative to conventional systems.

In accordance with the invention, control information associated with a given packet of the received information is identified and compared with a decoding requirement of the packet, in order to control the generation of an error indicator for the packet. The error indicator may be generated in response to an inconsistency between the control information and the decoding requirement. For example, the control information may include an indication of packet length that can be compared to a number of bits required in a Huffman decoding process applied to the corresponding packet, with any inconsistency between the packet length indication and the number of required bits leading to the generation of an error flag for the packet.

The digital information may be encoded compressed audio information in the form of a bitstream including a series of packets generated by a perceptual audio coder (PAC) encoder or other suitable encoder. Error flags generated as a result of the error screening may be utilized to trigger an error mitigation algorithm in a PAC decoder. As another example, the error flags may be supplied to a channel decoder and used in the selection of alternative decoding paths, in accordance with a List Viterbi algorithm technique.

Although particularly well-suited for detecting bursty channel errors, the above-described error screening can detect any type of transmission error, and does not require any particular type of transmission coding. In addition, error screening of this type can be used in conjunction with other types of error detection, e.g., cyclic redundancy code (CRC) error detection. For example, error screening based on Huffman code and control information consistency may be used in conjunction with outer code CRC error detection in order to achieve a desired level of performance with a less powerful CRC.

Moreover, although illustrated herein using an embodiment which includes both an inner channel code and an outer channel code, the invention can be implemented with either an inner code or an outer code, or with no channel code.

The invention can be applied to other types of digital information, including, for example, data, video and image information. In addition, the invention may be implemented in numerous applications other than FM and AM hybrid, in-band on-channel (HIBOC) DAB systems, such as Internet and satellite broadcasting systems, systems for simultaneous delivery of audio and data, etc. Moreover, the invention is applicable not only to perceptual coders but also to other types of source encoders using other compression techniques over a wide range of bit rates.

DETAILED DESCRIPTION OF THE INVENTION

The invention in the illustrative embodiment to be described below provides error screening techniques particularly well-suited for use in conjunction with the transmission of audio information bits, e.g., compressed audio bits generated by an audio coder such as a perceptual audio coder (PAC). It should be understood, however, that the error screening techniques of the invention may be applied to many other types of information, e.g., video or image information, and other types of coding devices. In addition, the invention may be utilized in a wide variety of different types of communication applications, including communications over the Internet and other computer networks, and over cellular multimedia, satellite, wireless cable, wireless local loop, high-speed wireless access and other types of communication systems. The invention may be utilized with any desired type of communication channel or channels, such as, for example, frequency channels, time slots, code division multiple access (CDMA) slots, and virtual connections in asynchronous transfer mode (ATM) or other packet-based transmission systems.

Figure 1:
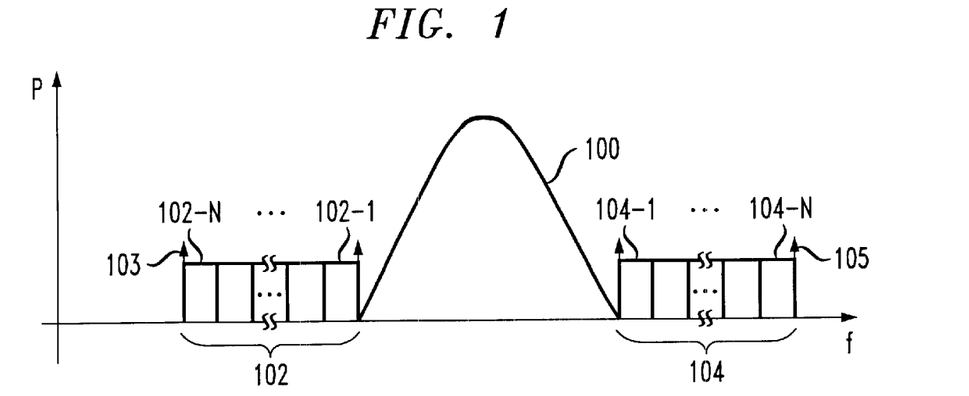
FIG. 1 shows a portion of a frequency spectrum of a hybrid, in-band on-channel (HIBOC) digital audio broadcasting (DAB) system in accordance with the invention.

FIG. 1 illustrates a portion of a frequency spectrum in an exemplary FM hybrid, in-band on-channel (HIBOC) digital audio broadcasting (DAB) system in which the invention may be implemented. The spectrum is plotted as power P as a function of frequency f. The portion of the spectrum shown includes an analog host FM signal 100 with associated lower digital sideband 102 and upper digital sideband 104. The sidebands represent portions of the frequency spectrum used to transmit digital audio information in the HIBOC DAB system.

In the illustrative embodiment of the invention, the DAB system may use as an inner code a complementary punctured pair convolutional (CPPC) code with optimum bit placement (OBP) in the digital sidebands 102, 104. CPPC codes and OBP techniques suitable for use in the systems of the invention are described in, e.g., U.S. patent application Ser. No. 09/217,655, filed Dec. 21, 1998 in the name of inventors Brian Chen and Carl-Erik W. Sundberg and entitled "Optimal Complementary Punctured Convolutional Codes," which is incorporated by reference herein. More specifically, the illustrative embodiment may use, e.g., a pair of rate-4/5, memory M=6 CPPC codes for the two sidebands, yielding a combined rate-2/5 code. The bit placement may be optimized, e.g., for a case in which the outermost frequency components are expected to be the sideband components most susceptible to first adjacent interference.

Although illustrated herein with CPPC codes, the invention can be utilized with numerous alternative code arrangements, e.g., classic code combining with OBP, multiple stream coding, etc. The system in the illustrative embodiment may use a cyclic redundancy code (CRC) as an outer forward error correcting (FEC) or error detecting code, and differential quadrature phase shift keyed (DQPSK)/orthogonal frequency division multiplexed (OFDM) modulation. The DQPSK modulation of transmitted symbols provides robustness to frequency-selective fading and oscillator phase drift. The differential encoding is performed in frequency between OFDM tones. The digital signal to be transmitted and the outer CRC block code are repeated in each of the sidebands 102, 104.

As shown in FIG. 1, each of the sidebands 102, 104 includes N components, 102-1, 102-2, ... 102-N, and 104-1, 104-2, ... 104-N, respectively. The components may represent, e.g., sets of OFDM carriers. Pilot tones 103 are present at either end of the sideband 102, and pilot tones 105 are present at either end of the sideband 104. Additional pilot tones, which are not shown, may be present elsewhere in the portion of the frequency spectrum shown. The pilot tones 103, 105 correspond to selected OFDM reference tones, and may be used, e.g., to determine the presence of interference.

The present invention provides improved error screening that may be implemented in the HIBOC DAB system of FIG. 1 as well as in other types of communication systems. A HIBOC system having a spectrum of the type illustrated in FIG. 1 will now be described in greater detail with reference to FIGS. 2 and 3.

Figure 2:
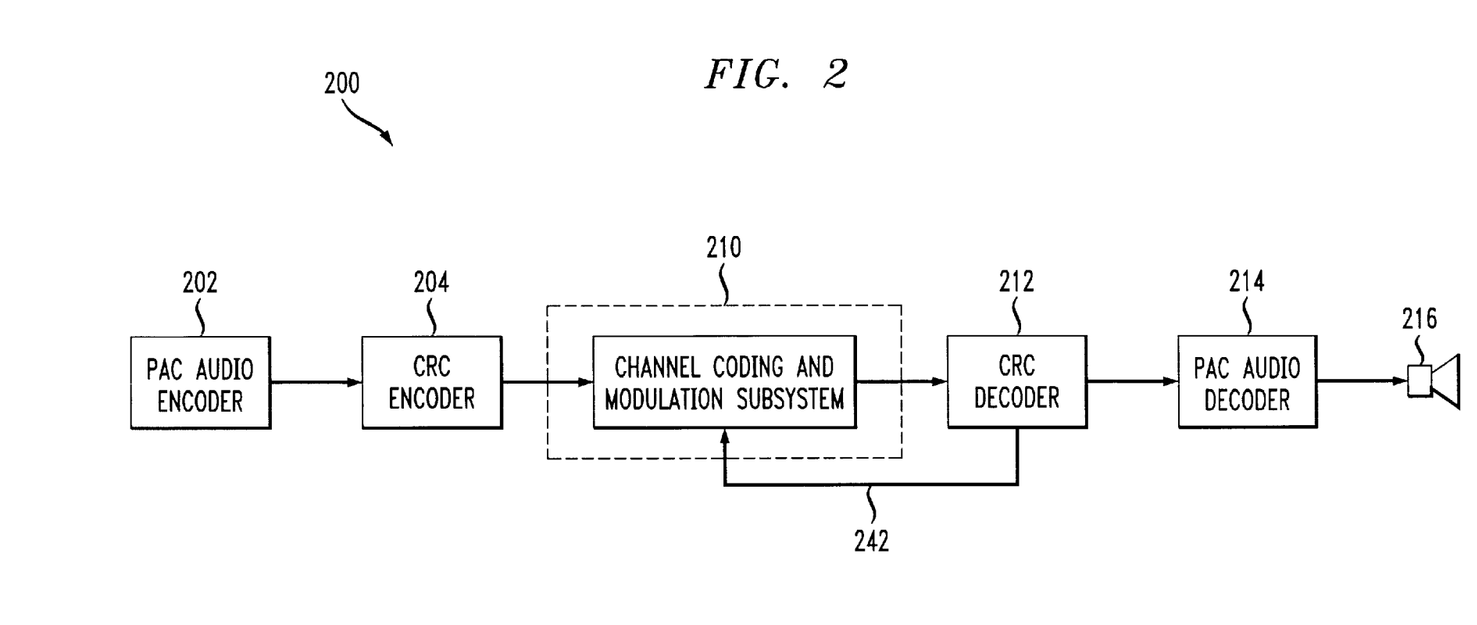
FIG. 2 is a block diagram of a HIBOC DAB system in which the invention may be implemented.

FIG. 2 shows an exemplary FM. HBOC DAB system 200 in which the invention may be implemented. The system 200 includes portions of a transmitter and a receiver. It should be noted that FIG. 2 shows primarily the digital portion of the system, i.e., the portions associated with generation and processing of the digital signals. Additional conventional processing elements may be used to process the analog signals.

In the system 200, a PAC audio coder 202 generates an encoded audio signal at a bit rate of, e.g., 96 kbps using the audio compression techniques described in, e.g., the above-cited PAC reference D. Sinha, J. D. Johnston, S. Dorward and S. R. Quackenbush, "The Perceptual Audio Coder," in Digital Audio, Section 42, pp. 42-1 to 42-18, CRC Press, 1998. The encoded audio bit stream is applied to a CRC encoder 204, which generates CRC bits in a conventional manner using a CRC error detecting block code, and then to a channel coding and modulation subsystem 210.

As previously noted, the CRC is an example of one type of outer code that may be used in the system 200. Other possible outer codes suitable for use with the present invention include, e.g., Reed-Solomon (RS) codes, Bose-Chadhuri-Hocquenghem (BCH) codes, as well as other types of block codes. Other cyclic codes, as well as non-cyclic shortened codes, can also be used as outer codes in accordance with the invention.

Figure 3:
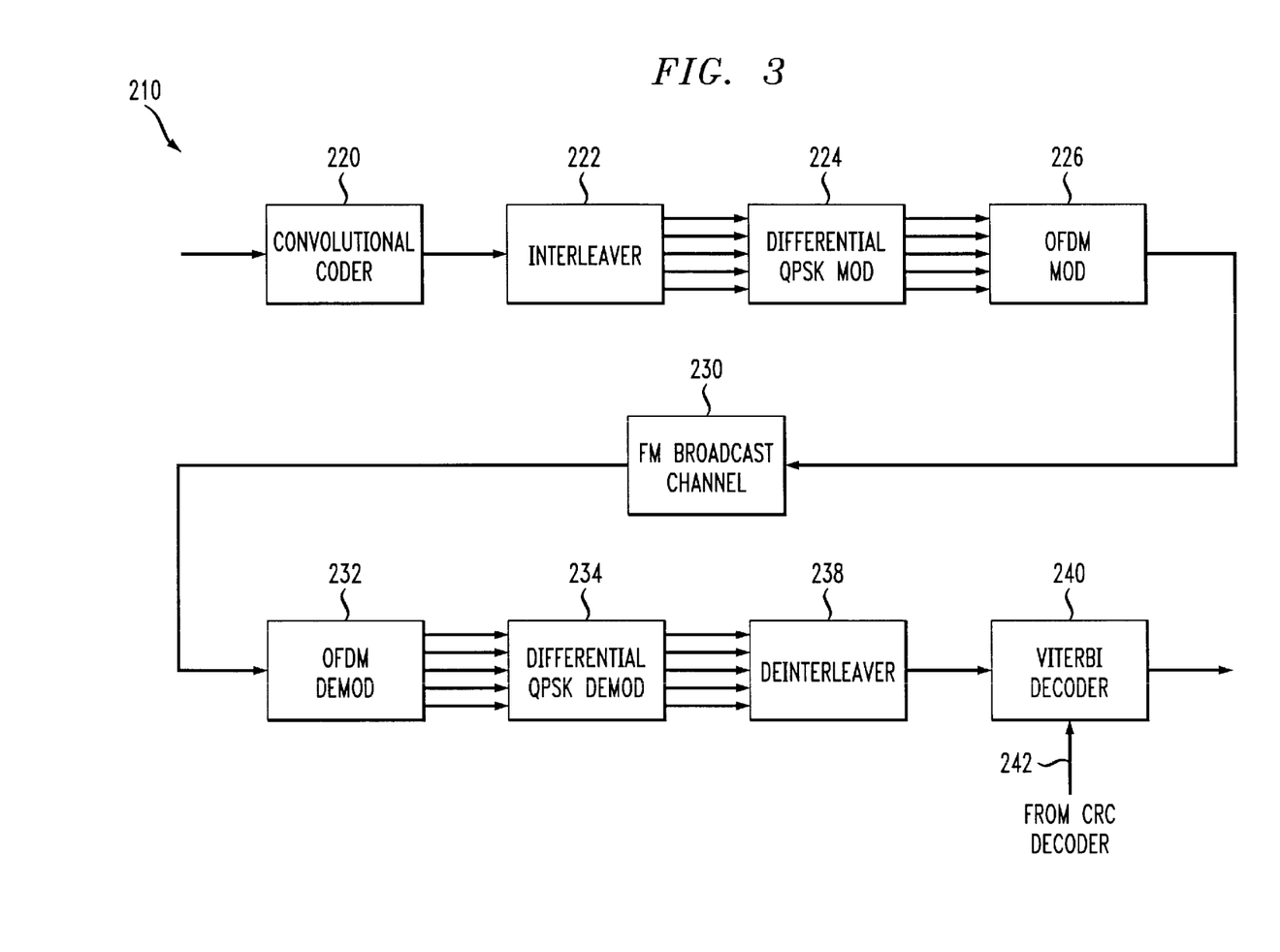
FIG. 3 is a block diagram showing a more detailed view of a channel coding and modulation subsystem of the FIG. 2 HIBOC DAB system.

As shown in FIG. 3, the subsystem 210 performs channel coding, modulation, transmission, reception, demodulation and channel decoding operations. It is assumed for purposes of illustration that the subsystem 210 includes an FM broadcast channel 230 over which the HIBOC DAB signals are transmitted. The subsystem 210 of FIG. 3 comprises a transmitter portion including a convolutional coder 220, e.g., a CPPC coder for coding the audio bitstream in accordance with the above-noted CPPC techniques, an interleaver 222, a DQPSK modulator 224, and an OFDM modulator 226.

As previously noted, the convolutional coding performed in coder 220 is an example of a type of inner code that may be used in the system 200. Other types of inner codes may also be used, including block or convolutional codes, so called "turbo" codes, and coding associated with trellis coded modulation. The modulated output of the OFDM modulator 226, which corresponds to the digital sidebands 102 and 104, is transmitted through the FM broadcast channel 230 to a receiver portion including an OFDM demodulator 232, a DQPSK demodulator 234, a deinterleaver 238, and a Viterbi decoder 240.

Referring again to FIG. 2, the demodulated and decoded received signal from the receiver portion of the subsystem 210 is applied to a CRC decoder 212, and then to a PAC audio decoder 214. The CRC decoder 212 generates an error flag which is supplied via output 242 to the Viterbi decoder 240 of FIG. 3. The error flag may also be used to trigger conventional error mitigation processes in the PAC audio decoder 214. The reconstructed audio signal from decoder 214 is applied to an output device 216, e.g., a speaker or set of speakers, for conversion to an audibly-perceptible form.

The Viterbi decoder 240 of FIG. 3 may utilize List Viterbi algorithm (LVA) techniques in which a CRC error flag or other type of outer code error flag is used to trigger selection of one or more alternative decoding paths generated by the decoder. For example, a CRC error flag supplied via output 242 may trigger selection of a next-most-likely path if the error flag indicates an error in the most-likely path, and so on.

Another example of an LVA technique suitable for use with the present invention is a so-called "short list" type of List Viterbi decoding. The list size in the illustrative embodiment is preferably on the order of, e.g., two, three or four entries. The short list is acceptable because first adjacent interference signals in typical FM HIBOC DAB systems generally lead to slowly changing interference levels, e.g., as a receiver in an automobile moves within an area with a first adjacent interference signal. Furthermore, it will generally be desirable for a given erased component to remain erased over a number of CRC frames. The exact list sizes and number of component erasures may be established using simulations, as will be apparent to those skilled in the art.

An output of a Huffman error screener such as that described in conjunction with FIG. 7 below can also be used to control selection of alternative paths in accordance with an LVA technique. For example, if a given CRC indicates that the corresponding information is not in error, but the Huffman error screener indicates the presence of an error, an error flag generated by the Huffman error screener can trigger selection of an alternative LVA decoding path.

The illustrative embodiment as described in conjunction with FIGS. 2 and 3 may include additional processing elements, such as modulators, multiplexers, upconverters and the like, which are not shown for simplicity of illustration. In addition, these embodiments may be implemented using other arrangements of elements, including elements other than those shown. Moreover, certain signal processing elements, such as the coders and decoders, may be implemented at least in part using one or more application-specific integrated circuits (ASICs), microprocessors or other types of digital data processors, as well as portions or combinations of these and other known devices. Various elements of the illustrative embodiment may also be implemented in whole or in part in the form of one or more software programs executed by a central processing unit (CPU) or the like in a digital data processor.

It should again be emphasized that the above-described configuration of the FM HIBOC system in the illustrative embodiment of the invention is by way of example only. Those skilled in the art will appreciate that the improved error screening techniques of the present invention may be implemented in numerous other types of systems, e.g., non-HIBOC systems.

The system of the illustrative embodiment may use a variety of different types of error screening techniques in order to determine the presence of errors in a received bitstream. Prior to describing these techniques, the audio encoding process implemented in PAC encoder 202 will be described in greater detail with reference to FIGS. 4, 5 and 6.

Figure 4:
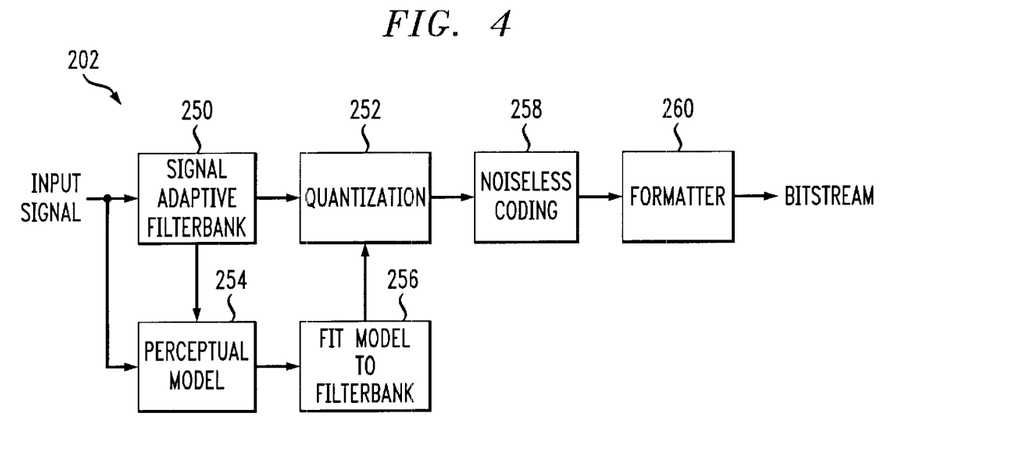
FIG. 4 shows a block diagram of a perceptual audio coder (PAC) audio encoder that may be utilized in the FIG. 2 HIBOC DAB system.

FIG. 4 shows one possible implementation of the PAC audio encoder 202 of the FIG. 2 system. An input signal is applied to a signal adaptive filterbank 250 which switches between an MDCT and a wavelet transform. In a manner similar to that previously described, the filterbank outputs are grouped into so-called "coderbands" and then quantized in a quantization element 252 using non-uniform vector quantizers, with quantization step sizes independently chosen for each coder band. The step sizes are generated by a perceptual model 254 operating in conjunction with a fitting element 256. The quantized coefficients generated by quantization element 252 are further compressed using a noiseless coding element 258 which in this example implements an adaptive Huffman coding scheme. In this implementation, a total of 15 different codebooks are employed, and for each coderband the best codebook may be chosen independently. The output of the noiseless coding element 258 is applied to a formatter 260 which generates a bitstream, as indicated in the figure.

Figure 5:
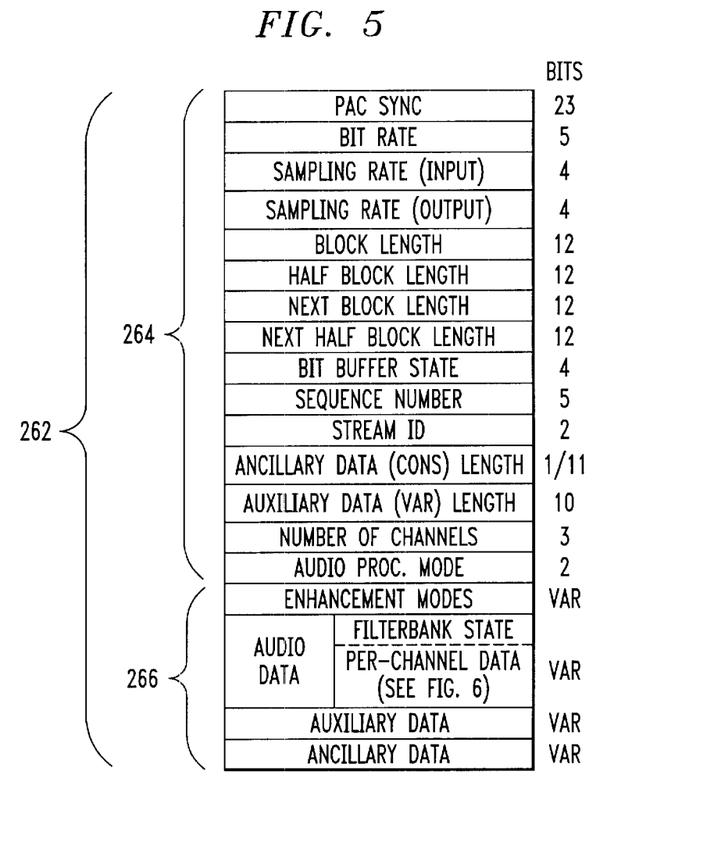
FIGS. 5 and 6 illustrate an exemplary packet format for encoded audio packets generated by the PAC audio encoder of FIG. 4.

FIG. 5 illustrates in greater detail the format of a single exemplary PAC packet 262 generated by the PAC audio encoder 202 of FIG. 4. At a 44.1 kHz sampling rate, each PAC packet corresponds to 1024 input samples from each audio channel, regardless of the actual number of audio channels. Each packet contains the Huffman-encoded filterbank outputs, codebook sections, quantizers and channel combination information for one 1024-sample block. The packet size is variable, i.e., packets corresponding to different sets of 1024 input samples can have different sizes. Depending on the application, various types of additional control information are added to a first packet or to every packet in a given bitstream. For potentially unreliable transmission channels, such as those typically used in DAB, a header is generally added to each packet. This header typically contains control information such as synchronization, error recovery, sample rate, number of audio channels, and the transmission bit rate.

The exemplary PAC packet 262 of FIG. 5 includes a header portion 264 and a payload portion 266. The header portion 264 of the packet 262 includes a 23-bit PAC synchronization (SYNC) code, a 5-bit bit rate indicator, 4-bit input and output sample rate indicators, 12-bit block length, half block length, next block length and next half block length indicators, a 4-bit bit buffer state indicator, a 5-bit sequence number, a 2-bit stream identifier (ID), a 1-bit or 11-bit ancillary data length indicator, a 10-bit auxiliary data length indicator, a 3-bit number of channels indicator, and a 2-bit audio processing mode indicator. The header portion 264 is followed by payload portion 266, which includes variable-length fields for enhancement modes, audio data, auxiliary data and ancillary data.

Figure 6:
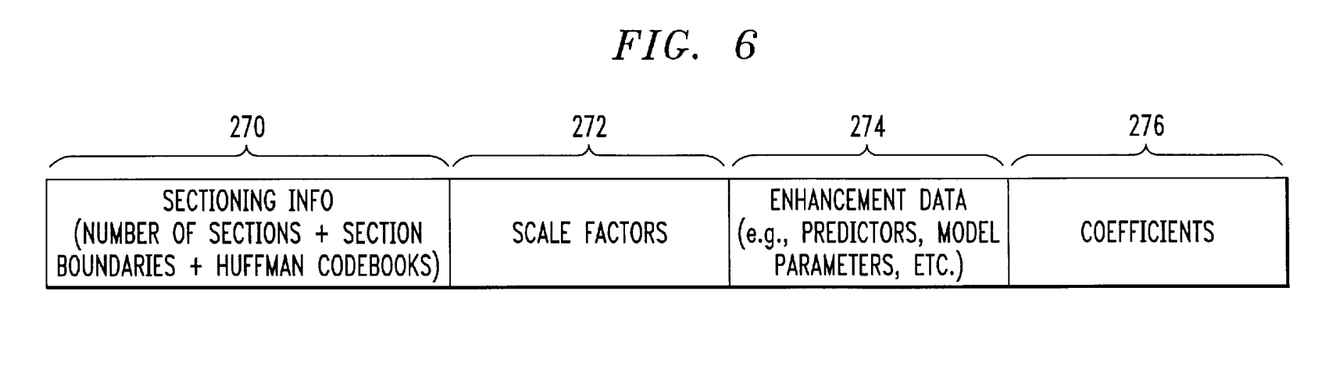

FIG. 6 shows an example of per-channel data in the audio data part of the payload portion 266. The per-channel data includes sectioning information 270 (e.g., number of sections, section boundaries and Huffman codebooks), scale factors 272, enhancement data 274 (e.g., predictors, model parameters, etc.) and coefficients 276. Additional details regarding the PAC packet format shown in FIGS. 5 and 6 can be found in the above-cited PAC reference and the format will therefore not be further described herein.

PAC error mitigation is based primarily on inter-packet interpolation. Such error mitigation can be enhanced by utilizing any partial information which is available uncorrupted within a given partially-corrupted PAC packet. The use of partial information improves the performance of PAC error mitigation. The error screening techniques of the present invention may be used to identify transmission errors that in turn trigger the operation of PAC error mitigation algorithms.

In accordance with the present invention, error screening techniques for identifying transmission errors are based on Huffman code and control information consistency. As previously noted, in a PAC bitstream each packet generally contains a sequence of Huffman codes describing a fixed block of audio samples, e.g., 1024 samples. Given that Huffman codes are self-parsing, the decoding of received bits may continue in a sequential fashion even in the presence of channel errors. However, the number of bits needed to decode a given fixed block of audio samples is likely to be different when errors are present. This can be combined with the fact that a PAC bitstream is designed to contain robust control information indicative of packet length to provide a reliable error indication.

More particularly, although the control information associated with a given packet is necessary for other tasks, e.g., reliable synchronization and buffering at the receiver, it can also be used as a consistency check against the number of bits demanded by the Huffman decoding process for the packet. Assuming that the control information is correctly received, any inconsistency between the packet length as indicated in the control information and the number of bits required by the Huffman decoding process can be used to flag a transmission error. As previously noted, this transmission error indication can then be used to trigger PAC error mitigation.

Figure 7:
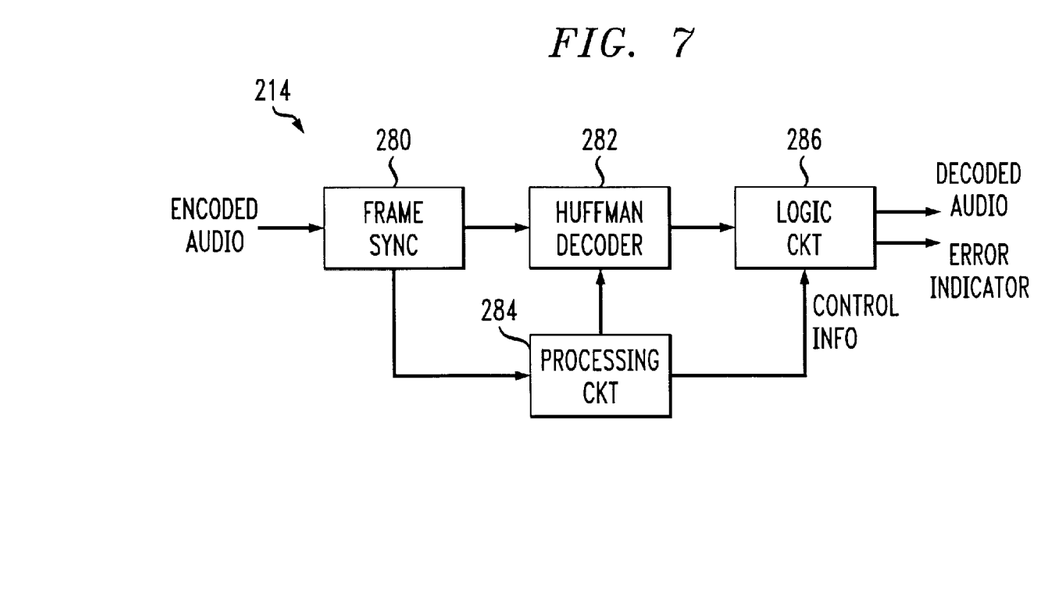
FIG. 7 shows one possible implementation of a PAC audio decoder in accordance with the invention.

FIG. 7 shows one possible implementation of PAC audio decoder 214 of FIG. 2 in accordance with the invention. The decoder 214 in this embodiment implements the above-described error screening based on Huffman code and control information consistency. An encoded audio bitstream received from the CRC decoder 212 is applied to a frame synchronization element 280. The synchronized output encoded audio bitstream from the frame synchronization element 280 is applied to a Huffman decoder 282 and an additional processing circuit 284. The Huffman decoder 282 decodes the audio information associated with the bitstream. This Huffman decoding process may be implemented in a well-known conventional manner, and is therefore not described in detail herein.

The processing circuit 284 separates out control information from the bitstream, and delivers at least a portion of this control information, including control information providing an indication of packet length, to a logic circuit 286. The logic circuit 286 compares the indication of packet length for a given packet, as determined from the control information received from processing circuit 284, to an actual number of bits required to decode the packet, as determined by the Huffman decoder 282. An inconsistency between the packet length as indicated by the control information and the number of required bits as indicated by the Huffman decoder triggers the generation of an error flag or other suitable error indicator by the logic circuit 286. The error indicator in turn may trigger conventional PAC error mitigation.

Output of the logic circuit 286 in this illustrative embodiment includes decoded audio as well as the error indicator. A processor or other device not shown in FIG. 7 may receive and further process the decoded audio and error indicator in order to implement PAC error mitigation. Such a processor or other device may also implement or otherwise incorporate in whole or in part one or more of the elements 280, 282, 284 and 286 of FIG. 7.

Although particularly well-suited for detecting bursty channel errors, the above-described error screening can detect any type of transmission error, and does not require any particular type of transmission coding. In addition, error screening of this type can be used in conjunction with other types of error detection, e.g., the previously-described outer code error detection. For example, the error screening based on Huffman code and control information consistency may be used in conjunction with outer code CRC error detection in order to achieve a desired level of performance with a less powerful CRC code.

Alternative implementations of the above-described error screening can utilize other types of codes, i.e., codes other than Huffman codes. For example, the invention may utilize so-called Tunstall codes, or any other type of source code that results in generation of a variable length packet or frame. It should be noted that when implemented with other types of codes, different types of control information may be used. For example, an implementation using Tunstall codes may utilize control information indicating how many coefficients were encoded. Other implementations can make use of detection of a second PAC SYNC word at the end of a given Huffman decoded sequence to provide a consistency check.

It should again be emphasized that alternative embodiments of the invention can utilize other types of outer codes, e.g., RS, BCH or other block codes, other types of inner codes, e.g., various types of convolutional codes, turbo codes, or coding associated with trellis coded modulation, and a variety of different types of interleaving, e.g., block interleaving, convolutional interleaving, or random interleaving. Embodiments which utilize an RS, BCH or other similar type of error correcting outer code can of course use the code for error correction as well as for generation of an error flag for controlling PAC error mitigation.

Moreover, the invention does not require the use of any particular channel code arrangement. Although illustrated using an embodiment which includes both an inner channel code and an outer channel code, the invention can be implemented with either an inner code or an outer code, or with no channel code.

In addition, although illustrated in the context of frequency division multiplexing (FDM), the invention can also be applied to a wide variety of frame formats, including time division multiplexed (TDM) and code division multiplexed (CDM) formats, as well as combinations of TDM, FDM, CDM and other types of frame formats. Furthermore, although not described in detail herein, numerous different types of modulation techniques may be used in conjunction with the invention, including, e.g., single-carrier modulation in every sideband component, or multi-carrier modulation, e.g., OFDM, in every sideband component. A given carrier can be modulated using any desired type of modulation technique, including, e.g., a technique such as m-QAM, m-PSK or trellis coded modulation.

It should be noted that the invention can be used with a wide variety of other types and arrangements of frequency spectra, e.g., spectra with a single frequency band and no host carrier signal, spectra with more than two sidebands, etc.

As previously noted, the invention can be applied to the transmission of digital information other than audio, such as data, video, images and other types of information. Although the illustrative embodiment uses audio packets, such as those generated by a PAC encoder, the invention is more generally applicable to digital information in any form and generated by any type of compression technique. The invention may be implemented in numerous applications, such as simultaneous multiple program listening and/or recording, simultaneous delivery of audio and data, etc. These and numerous other alternative embodiments and implementations within the scope of the following claims will be apparent to those skilled in the art.

What is claimed is:

1. A method of processing digital information received in a communication system, the method comprising the steps of:

identifying control information associated with a given packet of the received digital information; and generating an error indicator for the packet based at least in part on a comparison of at least a portion of the control information of the given packet with a decoding requirement associated with the digital information of the given packet.

2. The method of claim 1 wherein the error indicator is generated in response to an inconsistency between the control information and the decoding requirement.

3. The method of claim 1 wherein the control information comprises an indication of packet length.

4. The method of claim 1 wherein the digital information comprises information encoded using a Huffman code.

5. The method of claim 1 wherein the decoding requirement comprises an indication of a number of bits required to decode the digital information.

6. The method of claim 1 wherein the digital information comprises encoded audio information.

7. The method of claim 1 wherein the digital information is encoded using an audio encoder to generate a plurality of packets including the given packet.

8. The method of claim 1 wherein the error indicator comprises an error flag generated by an audio decoder and utilized in conjunction with an error mitigation algorithm in the decoder.

9. The method of claim 1 wherein the error indicator is utilized to select an alternative decoding path in accordance with an LVA technique.

10. The method of claim 1 wherein the received digital information is transmitted using at least one of an inner code and an outer code.

11. An apparatus for processing digital information received in a communication system, the apparatus comprising:

a decoder operative to identify control information associated with a given packet of the received digital information, and to generate an error indicator for the packet based at least in part on a comparison of at least a portion of the control information of the given packet with a decoding requirement associated with the digital information of the given packet.

12. The apparatus of claim 11 wherein the error indicator is generated in response to an inconsistency between the control information and the decoding requirement.

13. The apparatus of claim 11 wherein the control information comprises an indication of packet length.

14. The apparatus of claim 11 wherein the digital information comprises information encoded using a Huffman code.

15. The apparatus of claim 11 wherein the decoding requirement comprises an indication of a number of bits required to decode the digital information.

16. The apparatus of claim 11 wherein the digital information comprises encoded audio information.

17. The apparatus of claim 11 wherein the digital information is encoded using an audio encoder to generate a plurality of packets including the given packet.

18. The apparatus of claim 11 wherein the error indicator comprises an error flag generated by an audio decoder and utilized in conjunction with an error mitigation algorithm in the decoder.

19. The apparatus of claim 11 wherein the error indicator is utilized to select an alternative decoding path in accordance with an LVA technique.

20. The apparatus of claim 11 wherein the received digital information is transmitted using an inner code and an outer code.

* * * * *